United States Patent [19]

Fox et al.

[11] 4,188,314

[45] Feb. 12, 1980

[54] SHAPED ARTICLE OBTAINED FROM A CARBONATE-POLYESTER COMPOSITION

[75] Inventors: Daniel W. Fox, Pittsfield; John A. Rock, Dalton, both of Mass.

[73] Assignee: General Electric Company, Pittsfield, Mass.

[21] Appl. No.: 920,256

[22] Filed: Jun. 29, 1978

Related U.S. Application Data

[63] Continuation-in-part of Ser. No. 750,511, Dec. 14, 1976, abandoned.

[51] Int. Cl.$^2$ .............................................. C08L 67/00
[52] U.S. Cl. .............................. 260/37 PC; 525/433
[58] Field of Search ........................... 260/860, 37 PC

[56] References Cited

U.S. PATENT DOCUMENTS

| | | |
|---|---|---|
| 3,915,926 | 10/1975 | Wambach ............................ 260/40 R |
| 3,953,539 | 4/1976 | Kawase et al. ........................ 260/860 |
| 4,056,504 | 11/1977 | Grundmeier et al. ............ 260/37 PC |
| 4,061,691 | 12/1977 | Margotte et al. ..................... 260/860 |
| 4,125,572 | 11/1978 | Scott ..................................... 260/860 |

*Primary Examiner*—Richard B. Turer
*Attorney, Agent, or Firm*—Myron B. Kapustij; William F. Mufatti

[57] ABSTRACT

A shaped article of an aromatic carbonate polymer and a polyester derived from cyclohexanedimethanol and a mixture of iso- and terephthalic acids.

11 Claims, No Drawings

SHAPED ARTICLE OBTAINED FROM A CARBONATE-POLYESTER COMPOSITION

This application is a continuation-in-part of copending application Ser. No. 750,511, filed Dec. 14, 1976 now abandoned.

This invention is directed to a shaped article comprising an aromatic carbonate polymer and a thermoplastic polyester resin derived from cyclohexanedimethanol and a mixture of iso- and terephthalic acids. This composition may additionally contain either individually or in combination a reinforcing amount of a reinforcing filler, a flame retardant additive and a foaming agent.

BACKGROUND OF THE INVENTION

Polycarbonates are well known and have been widely employed for the production of thermoplastic molded articles.

Polycarbonate derived from bisphenol-A is a high-performance plastic with good impact strength. In addition to ductility (impact strength), an article molded from general-purpose polycarbonate has high transparency, wide temperature limits (high impact resistance below −60° C. and a UL thermal endurance rating of 115° C. with impact), good dimensional stability, high creep resistance and electrical properties which qualify it as sole support for current carrying parts (up to 125° C. without loss of impact strength).

Polycarbonate has low water absorption, good stain resistance and a wide range of colorability. However, polycarbonates have a relatively limited range of chemical resistance, which necessitates careful appraisal of applications involving contact with certain organic solvents, some detergents, strong alkali, certain fats, oils and greases.

It is reported in the prior art that mixtures of polycarbonates and organic fibers improve the flame resistance of polycarbonates. Thus, U.S. Pat. No. 4,061,691 describes a molding composition having improved flame-resistance containing polycarbonate and organic fibers, which include, inter alia, highly crystalline or highly heat distortion-resistant saturated thermoplastic polyesters such as poly(ethylene terephthalate), poly(butylene terephthalate) and poly(1,4-dimethylenecyclohexane terephthalate). However, the inclusion of these aforementioned polyester fibers generally tends to adversely affect the impact strength and transparency of these products as compared to polycarbonates which do not contain said polyester fibers.

Further, U.S. Pat. No. 4,056,504 describes polycarbonate molding resins with improved flow and strength properties which contain about 10 to 40 weight percent glass fibers and about 0.5 to 5 weight percent of polyalkylene glycol terephthalate or about 0.5 to 10 weight percent of polyalkylene glycol isophthalate. The presence of these aforedescribed polyesters generally, however, adversely affects the optical transparency of these polycarbonate compositions thereby making them generally unsuitable for many uses, such as windows and the like, where optical transparency and clarity are required. Furthermore, this patent discloses that the addition of larger amounts of polyalkylene-iso-phthalates detracts from the polycarbonate properties such as impact strength.

DESCRIPTION OF THE INVENTION

It has been discovered that when a polyester polymer derived from a cyclohexanedimethanol and a mixture of iso- and terephthalic acid is added to an aromatic carbonate polymer, the article shaped from this composition has enhanced solvent resistance as compared to an article shaped from a polycarbonate resin. An article shaped from the composition of this invention also retains clarity as well as the mechanical and physical properties, such as, for example, impact strength, of a typical article shaped from a polycarbonate composition. Further, an article shaped from the instant composition retains the non-opaque, more specifically transparent, characteristics of an article shaped from a polycarbonate composition as compared to an article shaped from a polyester composition which has a pronounced tendency to crystallize and change from transparent to opaque-translucent. Also, an article shaped from the instant composition has higher dimensional stability than an article shaped from a polyester polymer derived from a cyclohexanedimethanol and tere- or isophthalic acid.

Additionally, because of its lower vacuum forming temperature, an article of an aromatic carbonate polymer and a polyester derived from a cyclohexanedimethanol and a mixture of tere- and isophthalic acids such as a sheet may be vacuum formed or thermally shaped into signs, shields, etc. without predrying the composition. This is significant since the time-consuming step of pre-drying the sheet, for example, is eliminated.

Additionally, it has been discovered that a large amount of UV stabilizer may be added to the composition of the shaped article of the instant invention without loss of impact strength of the shaped article as compared to the addition of this amount of UV stabilizer to a polycarbonate composition which results in degradation and embrittlement of the resultant shaped article.

According to the instant invention, there is provided a shaped article of:

(a) an aromatic carbonate polymer; and (b) a polyester polymer derived from cyclohexanedimethanol and a mixture of tere- and isophthalic acids.

The aromatic carbonate polymer of the instant invention has recurring units of the formula:

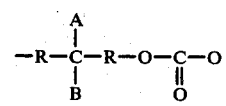

wherein each —R— is selected from the group consisting of phenylene, halo-substituted phenylene and alkyl substituted phenylene and A and B are each selected from the group consisting of hydrogen, hydrocarbon radicals free from aliphatic unsaturation and radicals which together with the adjoining $$-\overset{|}{\underset{|}{C}}-$$

atom form a cycloalkane radical, the total number of carbon atoms in A and B being up to 12.

The aromatic carbonate polymer of this invention may be prepared by methods well known in the art and as described in U.S. Pat. No. 3,989,672 all of which are incorporated by reference.

Also, included herein are branched polycarbonates wherein a polyfunctional aromatic compound is reacted with the dihydric phenol and carbonate percursor to provide a thermoplastic randomly branched polycarbonate wherein the recurring units of formula I contain branching groups.

The preferred polycarbonate resins may be derived from the reaction of bisphenol-A and phosgene. These polycarbonates have from 10-400 recurring units of the formula:

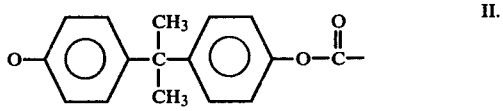

II.

The polycarbonate should have an intrinsic viscosity between 0.3 and 1.0 dl./g. preferably from 0.40 to 0.65 dl./g. as measured at 25° C. in methylene chloride or a similar solvent.

The instant polyester resins may be derived from the reaction of either the cis- or trans- isomer (or a mixture thereof) of 1,4-cyclohexanedimethanol with a mixture of iso- and terephthalic acids. These polyesters have recurring units of the formula:

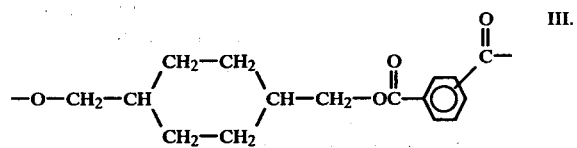

III.

These polyesters can be produced by well known methods in the art such as those set forth in U.S. Pat. No. 2,901,466 which is incorporated herein by reference.

Of course, it is understood that the polyester resins of this invention can be prepared by condensing 1,4-cyclohexanedimethanol and minor amounts of other bifunctional glycols with the mixture of tere- and isophthalic acids. These other bifunctional glycols include the polymethylene glycols containing from 2 to 10 or more carbon atoms such as ethylene glycol, butylene glycol, etc.

The hexacarbocyclic dicarboxylic acids which are condensed with the aforedescribed cyclohexanedimethanol are mixtures of terephthalic and isophthalic acids. Generally, these mixtures contain, in weight percent, from about 5% to about 90% isophthalic acid and from about 95% to about 10% terephthalic acid, preferably from about 10% to about 80% isophthalic acid and from about 90% to about 20% terephthalic acid, and more preferably from about 10% to about 25% isophthalic acid and from about 90% to about 75% terephthalic acid.

These polyesters should have an intrinsic viscosity between 0.40 and 2.0 dl./g. measured in a mixture of 40% tetrachloroethane/60% phenol solution or a similar solvent at 25° C.–30° C. Especially preferred polyester will have an instrinsic viscosity in the range of 0.6 and 1.2 dl./g.

The instant molded article may additionally contain a reinforcing amount of a reinforcing filler. The reinforcing agents may be selected from finely divided aluminum, iron or nickel and the like, metal oxides and nonmetals, such as carbon filaments, silicates, such as mica, aluminum silicate (clay), talc, asbestos, titanium dioxide, Wollastonite, novaculite, potassium titanate and titanate whiskers, glass flakes, glass beads and fibers, and polymeric fibers and combinations thereof.

Although it is only necessary to use a reinforcing amount of the reinforcing agent, from 1-60 parts by weight of the total weight of the composition may comprise the reinforcing agent. A preferred range is from 5-40 parts by weight.

The preferred reinforcing agents are of glass, and it is preferred to use fibrous glass filaments, mixtures of glass and talc, glass and mica and glass and aluminum silicate, for example. The preferred filaments for plastics reinforcement are made by mechanical pulling. Preferably, the glass filament diameters range from about 0.00012 to about 0.00075 inch, but is not critical to the present invention.

The instant molded article may additionally contain a flame-retardant additive in a minor proportion but in an amount at least sufficient to render the molded article non-burning or self-extinguishing.

When used herein the terms "non-burning" or "self-extinguishing" are used to describe a molded article which meets the standards of Underwriters Laboratories Standard 94.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, and nitrogen. It is preferred that the flame-retardant additive comprise a halogenated organic compound (brominated or chlorinated); a halogen-containing organic compound in admixture with an organic or inorganic antimony compound, e.g., antimony oxide; or a mixture of two or more of the foregoing.

The amount of flame-retardant additives used is not critical to the invention, so long as it is present in a minor proportion based on said composition—major proportions will detract from physical properties. Those skilled in the art are well aware that the amount will vary with the nature of the polymers in the blend and with the efficiency of the additive. In general, however, the amount of additive will be from 0.5 to 50 parts by weight per hundred parts of resin. A preferred range will be from about 3 to 25 parts and an especially preferred range will be from about 5 to 15 parts of additive per 100 parts of resin.

A preferred flame-retardant additive of this invention is a copolycarbonate which is derived from a halogen-substituted dihydric phenol and a dihydric phenol, said halogen preferably being chlorine or bromine. Preferably, this copolycarbonate is the product of a halogenated bisphenol-A such as tetrabromobisphenol-A and tetrachlorobisphenol-A and a dihydric phenol such as bisphenol-A. Preferably, this copolycarbonate consists of 75 to 25 weight percent of the product of tetrabromobisphenol-A and, correspondingly, 25 to 75 weight percent of the product of bisphenol-A, based on the weight of the copolycarbonate. The preparation of this copolycarbonate is set forth in U.S. Pat. No. 3,334,154 which is incorporated herein by reference.

Particularly preferred flame-retardant additives for use in this invention are low molecular weight polymers of a carbonate of a halogenated dihydric phenol. Preferred such polymers contain from 2 to 10 repeating units of the formula

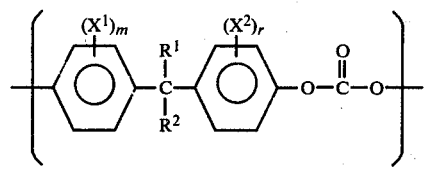

wherein $R^1$ and $R^2$ are hydrogen, (lower) alkyl or phenyl, $X^1$ and $X^2$ are bromo, chloro alkyl or aryl and m and r are from 0 to 4. The polymeric additives will have a low volatility when heated above 200° C., and a softening point of less than about 300° C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably, a monohydric phenol, and most preferably, a halogenated phenol and phosgene or a reactive derivative thereof in the presence of an acid acceptor, e.g., an amine or caustic. Details concerning the preparation and use of such compounds are given in U.S. Pat. No. 3,955,277 issued Dec. 17, 1974 and incorporated herein by reference.

A preferred additive may be represented by the following formula:

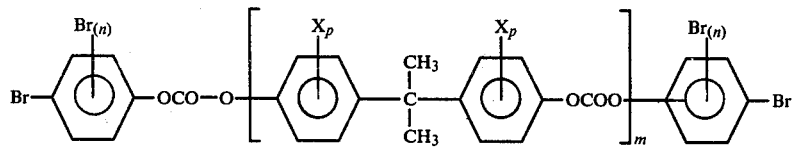

wherein X and p are as defined above, n is an integer of 2 to 4, m is an integer of from 2 to about 400.

These additives are set forth in U.S. Pat. No. 3,751,400 which is incorporated herein by reference.

A most preferred additive is of the formula:

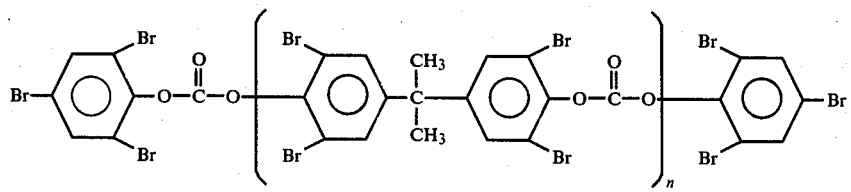

wherein the average number of repeating units, n, will be from about 3 to about 7, and the softening point will be in the range of from 200° to 260° C.

Another preferred flame-retardant additive is a polyhalodiphenyl carbonate containing 6–10 halogen atoms and preferably the polyhalodiphenyl carbonate being decabromodiphenyl carbonate. These polyhalodiphenyl carbonates are described in U.S. Pat. No. 3,382,207 which is incorporated herein by reference.

The shaped article of the instant invention may additionally contain a foaming agent.

The foaming agent may be selected from chemicals containing decomposable groups such as azo, N-nitroso, carboxylate, carbonate, heterocyclic nitrogen containing and sulfonyl hydazide groups, gaseous agents as well as volatile liquids.

A preferred class of chemical foaming agents are dihydrooxadiazinones of the formula:

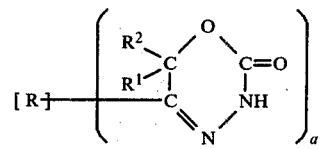

where "a" is an integer equal to 1 or 2, R is a monovalent radical when "a" is 1 and R is a divalent radical when "a" is 2, and R is selected from alkyl radicals and aryl radicals, alkylene and arylene radicals, and $R^1$ and $R^2$ are monovalent or divalent radicals which can be the same or different selected from hydrogen, alkyl, alkylene, a cycloaliphatic ring structure including $R^1$ and $R^2$, alkoxy radicals and arloxy radicals, etc.

These dihydrooxadiazinones are fully described in patent application of George E. Niznik Ser. No. 608,450, filed Aug. 25, 1975, titled "Dihydrooxadiazinones and Method for Making" and assigned to the same assignee as the instant invention. This application is incorporated herein by reference. These dihydrooxadiazinones are prepared by well known prior art methods as well as by a method disclosed in said patent application.

The foaming agent is used in amounts of from 0.05 to about 2.0 weight percent based on the weight of the polymer composition.

The foaming agent is added to the polymer composition in several ways which are well known to those skilled in the art.

When a foaming agent is added to a composition comprising an aromatic carbonate polymer and a polyester derived from a cyclohexanedimethanol, a foamed article shaped therefrom has enhanced solvent resistance as compared to an article shaped from a foamed polycarbonate composition.

The shaped article of the instant invention can be prepared by a number of well known methods in the art and the particular method employed is not critical.

The composition itself is prepared by blending the polycarbonate resin with the polyester resin along with (if used) the reinforcing agent, flame-retardant additives, and foaming agents in an extruder under standard conditions.

The aromatic polycarbonate and the polyester resin derived from cyclohexanedimethanol and mixtures of terephthalic and isophthalic acids are combinable in all proportions. Preferably, the polyester derived from cyclohexanedimethanol and a mixture of tere- and isophthalic acids comprises from 5 to 50 parts by weight of the composition. When the composition comprises about 50 parts by weight or less of the polyester derived from a cyclohexanedimethanol and a mixture of tere- and isophthalic acids, the heat distortion temperature of the composition will be above 100° C. so that an article shaped from such a composition will be able to stand up to boiling water.

The preferred shaped articles will be in the form of a sheet or a helmet.

Obviously, other materials can also be employed with the composition of this invention and include such materials as anti-static agents, pigments, mold release agents, thermal stabilizers, impact modifiers, extenders, UV stabilizers and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

A dry blend of 50 parts of polycarbonate resin (Lexan 101, General Electric Company) and 50 parts poly(1,4-cyclohexanedimethanol-terephthalate-co-isophthalate) (Kodar A150, Eastman Kodak Co.) are compounded, along with conventional stabilizers, and extruded at about 500° F. The extrudate is pelletized and injection molded into 6 inch × 18 inch × ⅛ inch thick sheets which weighed 320 grams. This is designated as Sample A. Sample B is the sheet molded from polycarbonate resin.

The test specimens are mounted in test jigs. The solvents listed in Table I are applied to individual test specimens continually for a period of one hour under stress. After this period of time, the test specimens are removed from the jigs and physically bent. The stress levels in psi are reported which are the maximum levels at which the samples remain ductile. The results are set forth in Table I.

TABLE I

| | Stress Levels (psi) | |
|---|---|---|
| Solvent | A | B |
| carbon tetrachloride | 500 | 500 |
| acetone | >500 | 500 |
| butylcellosolve | 1000 | 1500 |
| gasoline (Amoco-white) | 500 | 500 |
| methyl ethyl ketone | 2000 | 500 |
| toluene | 1500 | 500 |
| benzene | 1000 | 500 |

EXAMPLE 2

Example 1 is repeated except that the test specimens of Sample A and Sample B are subjected to a 1500 psi stress while continually wetting the test specimens with the solvents specified in Table II. The time in minutes at which stress cracking occurs is measured and is set forth in Table II.

TABLE II

| | Time to Stress Crack (Minutes) | |
|---|---|---|
| Solvent | A | B |
| acetone | 26 | 1 |
| gasoline (Amoco-white) | 22 | immediate |
| carbon tetrachloride | 1.5[1] | 1.5[2] |

[1] Two small surface cracks which did not propogate after 30 minutes.
[2] Fractures across entire sample.

EXAMPLE 3

Example 1 is repeated except that the molded plaques designated Samples A and B are subjected to failing dart impact test instead of the solvent test. Both Samples A and B withstood greater than 120 ft.-lbs. impact.

EXAMPLE 4

The composition as described in Example I and also the polycarbonate resin of Example I is compounded and extruded into pellets as in Example I. The pellets are fed into an HPM molding machine under conventional techniques and molded into a universal helmet weighing between 430–440 grams. The helmet molded from the resin blend was labeled Sample C while the helmet molded from the polycarbonate resin was labeled Sample D. The helmets were impact tested using an aluminum missile air cannon as produced by helmet manufacturers. The helmets were first impacted at 150 ft.-lbs. and then at 300 ft.-lbs. Both Samples C and D withstood these impacts without any evidence of cracking or tearing.

EXAMPLE 5

A dry blend of 50 parts of polycarbonate resin (Lexan 101, General Electric Company) and 50 parts poly(ethylene terephthalate) are compounded, along with conventional stabilizers, and extruded at about 500° F. The extrudate is pelletized and injection molded into 6 inch × 18 inch × ⅛ inch thick sheets which weighed 320 grams. This is designated as Sample E.

Samples A, B and E are inspected for transparency. Samples A and B are substantially identical in respect to transparency and both are transparent. Sample E, on the other hand, is so inferior in optical properties to samples A and B that, in effect, sample E is substantially translucent rather than substantially transparent.

Glass transition temperatures, Tg, are obtained for Samples A, B, E, poly(ethylene terephthalate), and Kodar A150 by using a differential scanning calorimeter. The results are set forth in Table III.

TABLE III

| Sample | Tg, °C. |
|---|---|
| A | 123° |
| B | 155° |
| E | 83°/152° |
| poly(ethylene terephthalate) | 82° |
| Kodar A150 | 94° |

As can be seen from Table III, the presence of one glass transition temperature for Sample A indicates that the polycarbonate and the polyester derived from cyclohexanedimethanol and a mixture of terephthalic and isophthalic acids are compatible. The presence of two glass transition temperatures in Sample E indicates that the polycarbonate and the poly(ethylene terephthalate) are not fully compatible. This incompatibility may adversely affect the properties of these compositions, such as, for example, the optical properties.

As can be seen from the data in the Examples, a shaped article of the instant invention has enhanced solvent resistance as compared to an article shaped from a polycarbonate resin. Additionally, a shaped article of the instant invention has comparable impact strength and optical properties to an article shaped from a polycarbonate resin; and has superior optical properties to an article shaped from a polycarbonate and a polyester such as poly(ethylene terephthalate).

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A shaped article in the form of a substantially transparent sheet having enhanced chemical resistance which consists of:
   (a) from 25 to 98 parts by weight of an aromatic carbonate polymer; and
   (b) from 2 to 75 parts by weight of a polyester polymer derived from cyclohexanedimethanol and a mixture of iso- and terephthalic acids wherein said mixtures contain from about 5% to about 90% isophthalic acid and from about 95% to about 10% terephthalic acid.

2. A shaped article as defined in claim 1 wherein the polycarbonate has recurring units of the formula:

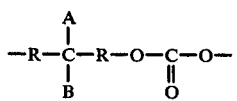

wherein each —R— is selected from the group consisting of phenylene, halo-substituted phenylene and alkyl substituted phenylene, and A and B are each selected from the group consisting of hydrogen, hydrocarbon radicals free from aliphatic unsaturation and of radicals which together and with the adjoining

atom form a cycloalkane radical, the total number of carbon atoms in A and B being up to 12.

3. A shaped article as defined in claim 2 wherein the polycarbonate has the repeating unit

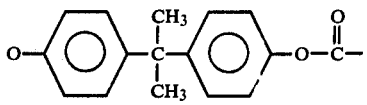

4. A shaped article as defined in claim 1 wherein the polyester polymer has the repeating unit:

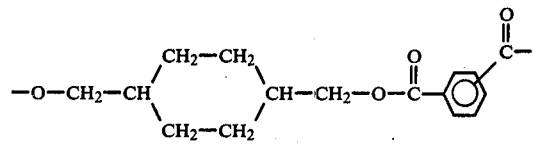

5. A shaped article having enhanced chemical and impact resistance which consists of:
   (a) from 25 to 98 parts by weight of an aromatic carbonate polymer;
   (b) from 2 to 75 parts by weight of a polyester polymer derived from cyclohexanedimethanol and a mixture of terephthalic and isophthalic acids wherein said mixtures contain from about 5% to about 90% isophthalic acid and from about 95% to about 10% terephthalic acid;
   (c) from 1 to 60 parts by weight of a reinforcing amount of a reinforcing filler.

6. A shaped article as defined in claim 5 wherein the polycarbonate has recurring units of the formula:

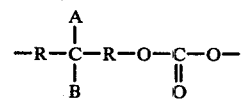

wherein each —R— is selected from the group consisting of phenylene, halo-substituted phenylene and alkyl substituted phenylene and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

7. A shaped article as defined in claim 6 wherein the polycarbonate has the repeating unit

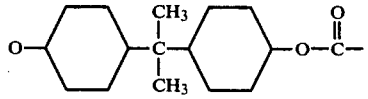

8. A shaped article as defined in claim 7 wherein the polyester polymer has the repeating unit:

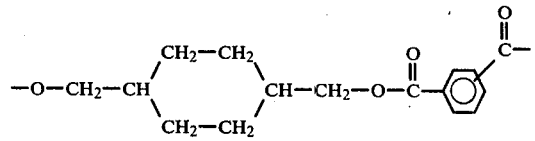

9. A shaped article as defined in claim 5 wherein the reinforcing filler is glass filler.

10. A shaped article as defined in claim 5 wherein said shaped article is in the form of a sheet.

11. A shaped article as defined in claim 5 wherein said shaped article is in the form of a helmet.

* * * * *